April 20, 1954 A. VAN WEEL 2,676,214
PULSE AMPLIFIER
Filed Feb. 13, 1951
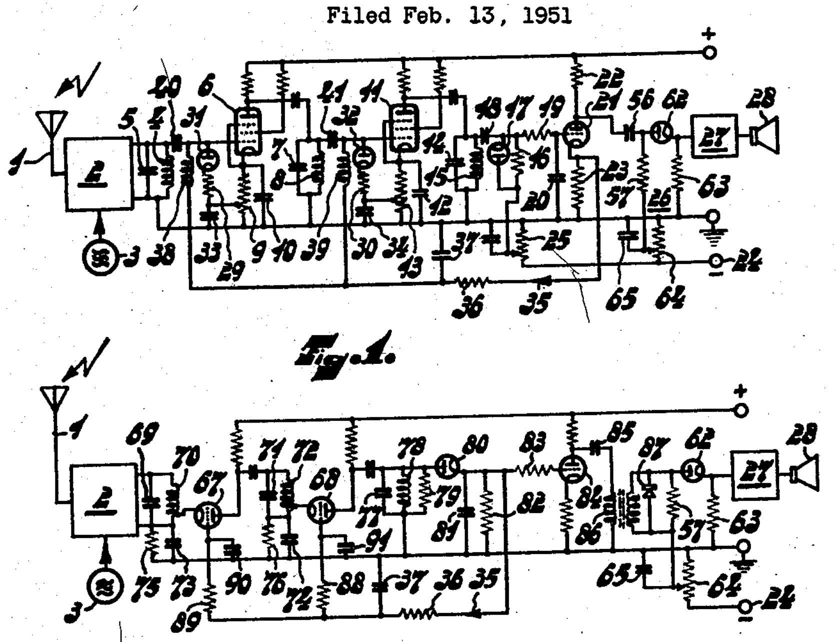
FIG. 1
FIG. 2
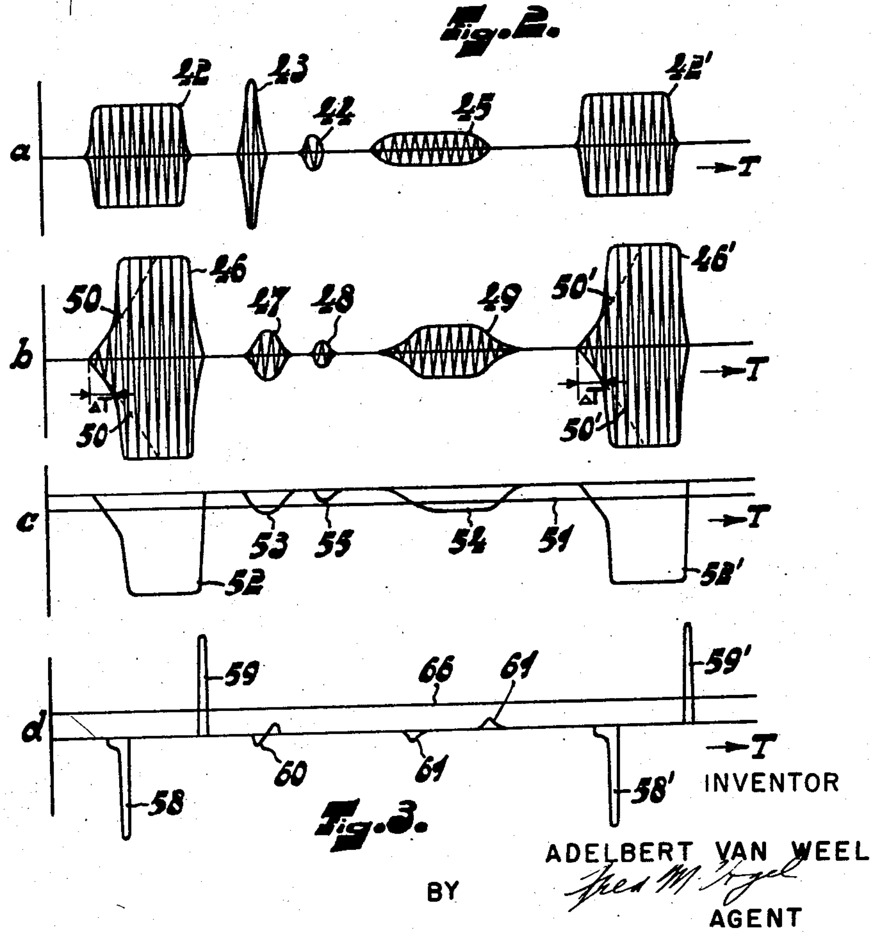
FIG. 3
INVENTOR
ADELBERT VAN WEEL
BY Fred M. Vogel
AGENT Patented Apr. 20, 1954

2,676,214

UNITED STATES PATENT OFFICE 2,676,214

PULSE AMPLIFIER

Adelbert van Weel, Eindhoven, Netherlands, assignor to Hartford National Bank and Trust Company, Hartford, Conn., as trustee Application February 13, 1951, Serial No. 210,744

Claims priority, application Netherlands March 8, 1950

14 Claims. (Cl. 179—171)

This invention relates to pulse amplifiers for the amplification of signal pulses modulated on a carrier wave and may be used with advantage in pulse radar apparatus, transceiving devices for pulse modulation, relay stations (repeater stations) for beam transmitter communications, and the like. The pulses may be modulated on the carrier wave by amplitude modulation or by frequency modulation.

The invention has for its object to realize the following combined advantages in selective pulse amplifiers comprising at least one amplifying tube and at least one oscillatory circuit tuned to the carrier wave:

1. A substantial decrease in the amount of signal distortion;

2. A highly effective discrimination between signal pulses and interference pulses;

3. Undistorted transmission of the trailing edge of the signal pulses;

4. A substantially constant amplifier gain for both signal and interference pulses.

According to the invention, the oscillatory circuit is connected, to a variable damping resistance, with both this resistance and the mutual conductance of the amplifying tube being controlled by control-pulses produced as a function of the signal pulses to be amplified in such fashion that each time a signal pulse is supplied to the oscillatory circuit, the damping of the oscillatory circuit and the mutual conductance of the amplifying tube are increased. The increased damping widens the bandwidth of the amplifier but attenuates the signal; the increasing mutual conductance increases the amplifier gain sufficiently to compensate for the signal attenuation.

The control-pulses may be obtained by means of amplitude detection of the signal pulses modulated on a carrier wave. As an alternative, the control-pulses may be taken from a local pulse generator.

In order that the invention and its advantages may be more clearly understood and readily carried into effect, they will now be described more fully with reference to the accompanying drawing.

Fig. 1 schematically shows a pulse receiver comprising a pulse amplifier according to the invention;

Fig. 2 schematically shows a pulse receiver including in modified form the pulse amplifier shown in Fig. 1, and Fig. 3, curves *a*, *b*, *c*, and *d* graphically show the output voltage yielded at various stages in the pulse amplifier shown in Fig. 1.

In the pulse receiver shown in Fig. 1, signal pulses modulated on a carrier wave are received through an aerial 1. The aerial 1 is connected to a receiving part 2, comprising a mixer having a local oscillator 3 and, if necessary, several intermediate-frequency amplifiers connected in cascade; the bandwidth of the said stages is sufficiently large to ensure a faithful amplification of the incoming pulses.

The pulses emanating from the receiver part 2 and modulated on the intermediate frequency are fed through a selective input circuit 4, 5 to the control-grid of a pentode 6 of the indirectly-heated type and used as a voltage amplifier. The pentode 6 has a selective output circuit 7, 8 and a grounded cathode resistance 9, which is shunted by a by-pass condenser 10.

For further voltage amplification, the output circuit 7, 8 of the pentode 6 is connected to the control-grid of a second pentode 11, connected as a voltage amplifier, in the same fashion as pentode 6. The pentode 11 comprises a cathode resistance 13, shunted by a by-pass condenser 12, and an output circuit 14, 15 tuned to the intermediate frequency.

The bandwidth of these two intermediate-frequency amplifiers is normally insufficient to ensure a faithful amplification of the signal pulses.

The receiving cascade furthermore comprises an amplitude detector of known type, which detects the signal pulses which are transmitted by the modulated intermediate frequency oscillations. The amplitude detector comprises a diode 17, which is shunted by a resistance 16, the cathode of this diode being connected via a detection condenser 18 to the output circuit 14, 15. The diode 17 constitutes a material load for the output circuit 14, 15, so that the selectivity of the circuit 14, 15 is appreciably reduced. In order to suppress undesired oscillations, the detected pulses occurring across the output resistance 16 of the diode detector are supplied to a low band-pass filter comprising a series resistance 19 and a parallel condenser 20.

The output circuit of the low band-pass filter is connected to the control-grid of a triode 21, used as a threshold device and cut off in normal use, having an anode resistance 22 and a cathode resistance 23. The negative grid-bias required to cut off the triode 21 is taken from a potentiometer 25 included between ground and a negative terminal 24 of a grid-bias battery and connected through resistances 16 and 19 to the control-grid of the triode 21.

When the amplitude of a detected signal pulse exceeds the threshold value of the triode 21, a voltage pulse of negative polarity is produced across the anode resistance 22. The voltage pulses thus obtained after passing the threshold are fed through a device 26, which will be described hereinafter, to a pulse demodulator 27, the output circuit of which is connected to a reproducing device 28.

In the pulse receiver so far described, a substantial decrease in interference is obtained because the selectivity of the two voltage amplifier circuits is such that the interference spectrum bandwidth is decreased. However, this decrease in interference is offset by the disadvantages that, due to the slight damping of the selective circuits employed in the pulse receiver, the leading and trailing edges of incoming pulses create transients with appreciable time constants. It has been found in practice that a further reduction of the bandwidth beyond a certain predetermined value will be of no value in decreasing interference.

According to the invention, the selective oscillatory circuits 4, 5 and 7, 8 are each connected to a variable damping resistance, each resistance and the mutual conductance of each of amplifying tubes 6 and 11 being included in the pulse amplifier being controlled by control-pulses produced as a function of the signal pulses, so that when a signal pulse is supplied to these circuits, both the damping and the mutual conductance are increased.

The additional damping of the oscillatory circuits permits a faithful amplification of the signal pulses, whilst the increase in mutual conductance is utilized to counteract the reduction in amplification produced by said damping.

In the pulse amplifier shown in Fig. 1, each of the selective oscillatory circuits 4, 5 and 7, 8 has connected to it in parallel a variable damping resistance, constituted by the series-combination of a resistance 29 and 30 respectively and a diode 31 and 32 respectively, the anodes being connected to the control grids of the tubes 6 and 11. The diodes 31 and 32 have then cathodes connected through the series resistances 29 and 30 to tappings on the cathode resistances 9 and 13, these tappings being grounded through by-pass capacitors 33 and 34, so that bias voltages are developed which normally render both diodes non-conducting.

The control-pulses are taken from the cathode resistance 23 of the triode 21 and supplied through a control-voltage channel 35 to the control-grids of the amplifying tubes 6 and 11. Each time when a signal pulse occurs, the cathode resistance 23 of the triode 21 has produced across it a control-pulse of positive polarity, these control-pulses producing simultaneously an increase in mutual conductance of the amplifying tubes 6 and 11 and rendering conductive the damping diodes 31 and 32 thereby increasing the damping of the associated oscillatory circuits.

The operation of the circuit-arrangement will now be set out in detail.

Upon initiation of a signal pulse, the voltage across the oscillatory circuit 14, 15 increases comparatively slowly as a function of the selectivity of the oscillatory circuits 4, 5 and 7, 8. When, after a certain time, ΔT, the voltage across the oscillatory circuit 14, 15 exceeds a certain threshold value, which is approximately equal to the sum of the threshold voltage of the triode 21 and the cut-off voltage of the diodes 31, 32, the damping of the oscillatory circuits 4, 5 and 7, 8 is increased as diodes 31 and 32 become conducting. This increased damping of the oscillatory circuits 4, 5 and 7, 8 ensures faithfulness in form of the amplified signal pulses.

The variable damping resistances 29, 31 and 30, 32 respectively are so proportioned that after release of the diodes 31 and 32, the bandwidth of the circuits 4, 5 and 7, 8 approximately corresponds with the bandwidth of the amplifying stages included in the preceding receiver part 2. A higher damping of the circuits 4, 5 and 7, 8 only produces an unnecessary reduction in amplification, whereas with unduly small damping a faithful amplification of the incoming signal pulses is not guaranteed.

Upon occurrence of a signal pulse, the damping of the oscillatory circuits 4, 5 and 7, 8 and the mutual conductance of the associated tubes 6 and 11 are preferably increased at least to such an extent that the amplification of the pulse amplifier remains substantially constant. Then, the pulse amplifier has the feature that, with constant amplification, the bandwidth is abruptly increased when a signal pulse occurs.

It should be noted here that the frequency spectrum of the signal pulses occurring across the oscillatory circuit 14, 15 varies with the bandwidth of the oscillatory circuits 4, 5 and 7, 8 with optimum damping. Each spectrum component of the detected signal pulses corresponds to two side-band frequencies of the intermediate-frequency carrier oscillation modulated by the signal pulses. The width of the frequency spectrum of the detected signal pulses is approximately equal to half the value of the optimum band-width of the oscillatory circuits 4, 5 and 7, 8.

In order to obtain a satisfactory reduction of interference, in practice it has been found particularly advantageous to supply the control-pulses obtained by detection of the signal pulses through a low-pass filter to the amplifying tubes 6 and 11, the passage of the low pass filter, being at the most, equal to half the value of the optimum bandwidth of the oscillatory circuits 4, 5 and 7, 8. In the embodiment shown, the low pass filter is constituted by a series resistance 36 and a parallel condenser 37. The output of the low pass filter is connected through high-frequency coils 38 and 39 respectively to the control-grids of the amplifying tubes 6 and 11, the coils 38 and 39 serving to decouple the oscillatory circuits 4, 5 and 7, 8.

For an undistorted transfer of the trailing edge of the signal pulses, the control-pulses have to remain operative until termination of the signal pulses to be amplified. For this purpose, the time-lag of the control-pulses introduced into the control-voltage channel 35 by the low pass filter 36, 37 and the high-frequency coils 38, 39 and the associated cut-off condensers 40, 41 has to exceed the duration of the time period over which the trailing edge of the signal pulses is supplied to the pulse amplifier.

The operation of the pulse amplifier described will now be explained more fully with reference graphs shown in Figs. 3*a*, *b*, *c*, *d*.

Fig. 3*a* shows two signal pulses 42 and 42′ supplied from the output of the receiver part 2 and also shows three intermediate interference pulses of carrier-wave frequency 43, 44, 45, this frequency corresponding to the tuning frequency of the oscillatory circuits 4, 5 and 7, 8. As compared with the amplitude and duration of the signal pulses 42 and 42′, the amplitude and duration of interference pulse 43 are respectively larger and smaller, while the amplitude and duration of interference pulse 44 are both respectively smaller, and the amplitude and duration of interference pulse 45 are respectively smaller and larger.

Fig. 3b shows the amplified signal pulses 46, 46′ occurring across the oscillatory circuit 14, 15 and interference pulses 47, 48, 49.

When the signal pulses are first applied, transients are produced, as indicated by curves 50 and 50′. Each time after a certain time-lag ΔT, the damping of the oscillatory circuits 4, 5 and 7, 8 is suddenly increased; thereafter the signal pulses are amplified with optimum bandwidth of the pulse amplifier. The variation of the amplified signal pulses 46, 46′ then is as shown in the figure.

The pulse amplifier shown provides a highly effective discrimination in duration and amplitude between signal and interference pulses.

Interference pulses of comparatively short duration as indicated by 43 and 44 in Fig. 3a, produce transient excitation of the selective circuits 4, 5 and 7, 8. Before the amplitude of the oscillations across the circuits 4, 5 and 7, 8 has reached its final value, the pulses 43 and 44 are terminated, with the result that the amplification factor for such interference pulses is materially lower than for the signal pulses. Consequently, short interference pulses occur in an attenuated form across the output circuit 14, 15 of the pulse amplifier. The pulsatory control-voltage obtained after detection and passage of such interference pulses through the threshold is usually insufficient to release the damping diodes 31 and 32.

Upon amplification of interference pulses of a comparatively long duration, as indicated by 45 in Fig. 3a, the amplitude of the oscillations across the circuits 4, 5 and 7, 8 substantially reaches its final value. Such interference pulses of small amplitude, however, do not bring about an increase in damping of the oscillatory circuits 4, 5 and 7, 8. It is important that the slopes of the leading and trailing edges of the interference pulses amplified at high selectivity, as indicated by 47, 48 and 49, should be materially smaller than those of the signal pulses 46, 46′.

Fig. 3c shows the pulsatory output voltages across the anode resistance 22 of the triode 21, operating as a threshold device. The threshold voltage is indicated by a horizontal line 51. Only those pulse parts of the signal pulses 52, 52′ and of the interference pulses 53, 54 which exceed the threshold voltage are allowed to pass, whereas the interference pulse 55 is completely suppressed.

In order to ensure optimum freedom from interference the anode of the triode used as a threshold device is connected to a differentiating network built up from a series condenser 56 and a parallel resistance 57. The output circuit of the differentiating network comprises an additional threshold device. Each time at the beginning and at the end of a pulse, the resistance 57 of the differentiating network has produced across it transient voltage pulses of negative or positive polarity, the amplitude of which is determined by the slope of the leading and trailing edges of the pulses supplied to the differentiating network.

The variation of the differentiated output voltage of the triode 21 is shown in Fig. 3d. It is evident from the figure that the amplitude of the voltage pulses 58, 59 and 58′ and 59′ coinciding with the beginning and the end of the signal pulses 52 and 52′ respectively is materially greater than that of the differentiated interference pulses 60, 61.

The trailing edge of the incoming signal pulses is amplified substantially without distortion. Consequently, for pulse position, pulse-frequency modulation and the like, the voltage pulses obtained by differentiation and those coinciding with the trailing edge of the signal pulses may be utilized with advantage in the further part of the apparatus.

In the pulse amplifier shown, the output resistance 57 of the differentiating network is connected for this purpose to the anode of a diode 62, which is usually cut-off by a bias voltage and the cathode of which is grounded through a resistance 63. The cut-off voltage is obtained by connecting the resistance 57 to a potentiometer 64 included between the negative terminal 24 of the grid-bias battery and ground and the tapping of which is grounded through a smoothing condenser 65. The cut-off voltage of the diode is indicated by a horizontal line 66 in Fig. 3d.

If a transient positive voltage pulse coinciding with the trailing edge of the signal pulse exceeds the cut-off voltage of the diode 62, the diode is thus transiently released and a short voltage pulse is supplied to the pulse demodulator 27. The differentiated interference pulses 60, 61 are completely suppressed by the threshold diode 62.

If necessary, the threshold device is followed by a relaxation generator for producing renewed pulses. Such pulse regenerators are particularly important in relay stations.

When using a pulse amplifier according to the invention, a particularly favourable efficiency may be obtained. The amplifying tubes 6 and 11 are preferably adjusted in normal use to low anode current. The amplitude of the control-pulses is so chosen, with respect to the supply voltages of the tubes, that the control-pulses each time produce an overload of the amplifying tubes by the signal pulses to be amplified. With the adjustment of the tubes as described, the excess of the permissible dissipation produced by transient overload should do no harm to the amplifying circuit.

It is not necessary to supply the control-pulses to the control-grids of the amplifying tubes. As an alternative, the control-pulses may be supplied to other electrodes of the amplifying tubes, for example to the cathode, screen-grid or anode or simultaneously to several electrodes.

The variable damping resistances may be of different construction, and may, for example, be constituted by a rectifier cell or an amplifying tube.

Fig. 2 shows a pulse receiver comprising a variant of the pulse amplifier shown in Fig. 1. Similar elements are designated by the same reference numerals.

The pulse amplifier shown in Fig. 2 comprises the cascade connection of two grounded grid amplifying stages. Each of the amplifying stages comprises a triode 67 and 68 respectively, the cathodes of which are grounded through tappings of selective input circuits 69, 70 and 71, 72 respectively and cathode resistances 75 and 76 respectively, shunted by smoothing capacitors 73 and 74 respectively. The output circuit of the triode 67 is constituted by the oscillatory circuit 71, 72 whereas the output circuit of the triode 68 comprises the parallel combination of an oscillatory circuit 77, 78 and a damping resistance 79.

For the detection of the oscillations occurring across the damped oscillatory circuit 77—79, the latter is connected to the anode of a diode 80, connected as a detector and the cathode of which is grounded through a detection resistance 82 shunted by a condenser 81. The detected oscillations are supplied through a series resistance 83 to the control-grid of a triod 84, the anode circuit of which includes a coupling condenser 85 and a transformer 86, provided with a high-frequency iron core and operating as a differentiating network. Across the secondary winding, which is shunted by a rectifier 87, voltage pulses of negative and positive polarity occur each time at the beginning and at the end of a signal pulse, the negative voltage pulses being suppressed by the rectifier cell 87. The positive voltage pulses coinciding with the end of the signal pulses are supplied to a pulse demodulator 27 through a threshold device 62—64, the operation of which is described with reference to Fig. 1.

Across the cathode of the detector diode 80 are produced control-pulses of positive polarity, which are supplied to the control-voltage channel 35 including the low pass filter 36, 37. The output circuit of the low pass filter 36, 37 is connected through decoupling resistances 88, 89 to the control-grids of the amplifying tubes 67, 68, these control-grids being connected to ground through coupling condensers 90, 91.

In a grounded grid amplifier, the input impedance is approximately inversely proportional to the mutual conductance of the amplifying tube. The amplifying stages shown in Fig. 2 thus operate as if a damping resistance varying with the mutual conductance of the amplifying tube were connected between the tapping of the oscillatory circuits 69, 70 and 71, 72 and ground, in a manner such that the damping of the oscillatory circuits 69, 70 and 71, 72 increases with the mutual conductance of the tubes. The amplifying tubes 67, 68 in the arrangement shown thus perform at the same time the function of variable damping resistances.

The amplitude of the pulse-shaped control-voltage corresponding to interference pulses of the type shown in Fig. 3a is materially smaller than the amplitude of the control-pulses produced as a function of the signal pulses. The slopes of the leading and trailing edges of the amplified signal pulses then appreciably exceed those of the amplified interference pulses.

The pulse amplifier shown differs from that described with reference to Fig. 1 in that here the bandwidth increases continuously with the control-voltage.

In the amplifying arrangements shown, the control-pulses are obtained directly by detection of the signal pulses. For producing the control-pulses, use may alternatively be made of a local pulse generator, which is synchronized by the incoming signal pulses in a known manner, for producing release pulses.

Apart from the pulse amplifiers shown, other constructions are possible, more particularly amplifying arrangements comprising an amplifying tube having a secondary-emission electrode. In such tubes material variations in mutual conductance are possible, for example, by a factor 10.

More particularly in pulse-amplifying arrangements comprising secondary-emission tubes, it is possible to insure that, upon occurrence of signal pulses, the amplification of the pulse amplifier as a whole is materially increased by the control-pulses.

As mentioned before, the arrangement shown may furthermore be utilized for the amplification of pulses modulated on a carrier wave by frequency modulation. The pulse amplifier shown essentially remains the same, only the amplitude detector is required to be replaced by a frequency detector.

What I claim is:

1. Apparatus for amplifying signal pulses appearing as a modulation component on a carrier wave, said apparatus comprising an amplifying stage including an electron discharge tube, means to apply said signal pulses as an input to said stage, an oscillatory circuit coupled to said stage for determining the band-pass characteristic of said stage, a variable damping impedance coupled to said oscillatory circuit for varying the quality thereof, means coupled to the output of said amplifying stage and responsive to the amplified signal pulses therein for producing direct-current control pulses as a function of said signal pulses, and means to supply the direct current control pulses to said tube and said impedance for simultaneously increasing the mutual conductance of said discharge tube and decreasing the value of said damping impedance, thereby increasing the damping of said oscillatory circuit.

2. A circuit arrangement, as set forth in claim 1, wherein the increase in the damping of the oscillatory circuit and the increase in the mutual conductance of the electron discharge tube are such that the amplification of said circuit-arrangement remains constant.

3. A circuit arrangement, as set forth in claim 1, wherein the control pulse causes the amplifying tube to saturate when the signal pulse is applied.

4. A circuit arrangement, as set forth in claim 1, wherein the control pulse becomes operative only after the signal pulse has reached a certain threshold value.

5. Apparatus, as set forth in claim 1, wherein said electron discharge tube in said amplifying stage includes a cathode, a grid and an anode, and circuits therefor, said cathode being connected to a high-frequency ground, and wherein said oscillatory circuit is included in the anode circuit of said stage and said variable damping impedance is connected in shunt relation with said oscillatory circuit.

6. A circuit arrangement, as set forth in claim 5, wherein the variable damping impedance is connected in parallel with the oscillatory circuit said variable impedance constituted by the series combination of a resistance and a diode, said diode normally being rendered non-conductive by a bias voltage, said diode becoming conductive only when control pulses are present.

7. A circuit arrangement, as set forth in claim 6, wherein the anode of the diode is coupled to the control grid of the electron discharge tube and wherein the control pulses possess positive polarity and wherein said pulses are supplied to said control grid and the anode of said diode.

8. Apparatus for amplifying signal pulses appearing as a modulation component on a carrier wave, said apparatus comprising an amplifying stage including an electron discharge tube, means to apply said signal pulses as an input to said stage, an oscillatory circuit coupled to said stage for determining the band-pass characteristic of said stage, a variable damping impedance coupled to said oscillatory circuit for varying the quality thereof, means coupled to the output of said amplifying stage and responsive to the amplified signal pulses therein for producing direct-current control pulses as a function of said signal pulses, and means to supply the direct-current control pulses to said tube and said impedance, comprising a direct-current control pulse channel including a low-pass filter which is connected to said amplifying stage, for simultaneously increasing the mutual conductance of said discharge tube and decreasing the value of said damping impedance.

9. Apparatus for amplifying signal pulses appearing as a modulation component on a carrier wave, said apparatus comprising an amplifying stage including an electron discharge tube having a cathode, a grid and an anode, and circuits therefor, means grounding said grid for signal frequencies, means to apply said signal pulses as an input to said stage, said tube and circuits including an oscillatory circuit included in the cathode circuit of said stage which determines the band pass characteristic of said stage, a variable damping impedance coupled to said oscillatory circuit for varying the quality thereof, means coupled to the output of said amplifying stage for deriving therefrom control pulses of positive polarity, and means for supplying said control pulses of positive polarity to said grid whenever a signal pulse occurs and thereby simultaneously increasing the mutual conductance of said discharge tube and decreasing the value of said damping impedance, when a control pulse is present.

10. A circuit arrangement, as set forth in claim 9, wherein the means coupled to the output of the amplifying stage for deriving therefrom control pulses comprises a signal pulse detector having a differentiating network included in the output circuit.

11. A circuit arrangement, as set forth in claim 10, wherein the output circuit of the differentiating network comprises a threshold device.

12. A circuit arrangement, as set forth in claim 11, wherein the threshold device only responds to voltage pulses which are obtained by differentiation and which correspond with the trailing edges of the incoming signal pulses.

13. A circuit arrangement, as set forth in claim 8, wherein the range of the low pass filter is at the most equal to half the band width of the oscillatory circuit with optimum damping.

14. A circuit arrangement, as set forth in claim 8, wherein the low pass filter has a time constant that enables the control pulse to be applied over a greater time interval than the time of passage of the trailing edge of the signal pulse.

References Cited in the file of this patent

UNITED STATES PATENTS

| Number | Name | Date |
|---|---|---|
| 2,066,333 | Caruthers | Jan. 5, 1937 |
| 2,236,690 | Mathes | Apr. 1, 1941 |
| 2,447,248 | Harris | Aug. 17, 1948 |